United States Patent
Dudar et al.

(10) Patent No.: US 9,340,106 B2
(45) Date of Patent: May 17, 2016

(54) SYSTEMS AND METHODS FOR AN EXTERNALLY ACCESSIBLE REFUELING REQUEST SWITCH

(71) Applicant: Ford Global Technologies, LLC, Dearborn, MI (US)

(72) Inventors: Aed M. Dudar, Canton, MI (US); Dennis Seung-Man Yang, Canton, MI (US); Russell Randall Pearce, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 14/265,220

(22) Filed: Apr. 29, 2014

(65) Prior Publication Data
US 2015/0306953 A1    Oct. 29, 2015

(51) Int. Cl.
  *B60K 15/05*    (2006.01)
  *F17D 5/02*    (2006.01)
(52) U.S. Cl.
  CPC . *B60K 15/05* (2013.01); *F17D 5/02* (2013.01); *B60K 2015/0561* (2013.01)
(58) Field of Classification Search
  CPC ... B60K 15/05; B60K 2015/0561; F17D 5/02
  USPC .......................................................... 701/36
  See application file for complete search history.

(56) References Cited

U.S. PATENT DOCUMENTS

| | | | |
|---|---|---|---|
| 4,926,914 A | 5/1990 | Morizumi et al. |
| 4,962,744 A | 10/1990 | Uranishi et al. |
| 5,172,655 A | 12/1992 | Forgacs |
| 5,878,728 A | 3/1999 | Kidokoro et al. |
| 6,167,923 B1 | 1/2001 | Hartsell, Jr. |

(Continued)

FOREIGN PATENT DOCUMENTS

| | | | | |
|---|---|---|---|---|
| EP | 2818351 A1 * | 12/2014 | ....... | B60K 15/03519 |
| WO | 0140109 A1 | 6/2001 | | |

OTHER PUBLICATIONS

Dudar, Aed M. et al., "System and Methods for Diagnosing Premature Refueling Shutoff," U.S. Appl. No. 14/084,207, filed Nov. 19, 2011, 49 pages.

(Continued)

*Primary Examiner* — Rodney Butler
*Assistant Examiner* — Brian P Sweeney
(74) *Attorney, Agent, or Firm* — James Dottavio; Alleman Hall McCoy Russell & Tuttle LLP

(57) ABSTRACT

A method for a vehicle, comprising: depressurizing a fuel tank while restricting access to a fuel fill line responsive to receiving a refueling request from a refueling request module located external to a vehicle cabin; and allowing access to the fuel fill line responsive to the fuel tank pressure decreasing below a threshold. In this way, all of the steps of a refueling procedure can be carried out entirely outside of a vehicle.

19 Claims, 10 Drawing Sheets

(56) References Cited

U.S. PATENT DOCUMENTS

| | | |
|---|---|---|
| 6,347,642 B1 | 2/2002 | Schulte |
| 6,360,789 B2 | 3/2002 | Walker et al. |
| 6,722,187 B2 | 4/2004 | Grieve et al. |
| 6,822,565 B2 | 11/2004 | Thomas et al. |
| 6,880,585 B2 | 4/2005 | Hart et al. |
| 7,000,654 B1 | 2/2006 | Rossi |
| 7,484,500 B2 | 2/2009 | Terada |
| 7,990,275 B1 | 8/2011 | Milanovich et al. |
| 8,397,552 B2 | 3/2013 | Jackson et al. |
| 8,447,495 B2 | 5/2013 | Pearce et al. |
| 8,448,675 B2 | 5/2013 | Mellone et al. |
| 8,583,305 B2 | 11/2013 | Novak et al. |
| 2013/0096774 A1 | 4/2013 | Takata |
| 2014/0026992 A1 | 1/2014 | Pearce et al. |

OTHER PUBLICATIONS

Anonymous, "A Remote Fuel Tank Depressurization Method for PHEV Vehicles," IPCOM No. 000241445, Published Apr. 28, 2015, 2 pages.

* cited by examiner

SYSTEMS AND METHODS FOR AN EXTERNALLY ACCESSIBLE REFUELING REQUEST SWITCH

BACKGROUND AND SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

Diverting fuel vapor located in the fuel tank to the fuel vapor canister prior to refueling is especially important for hybrid electric vehicles (HEVs). Such vehicles are designed to run primarily on an electric motor and only occasionally use the internal combustion engine, resulting in fewer opportunities to purge the fuel vapor canister. Furthermore, HEVs feature a fuel tank isolation valve that seals the fuel tank in order to maintain fuel vapor within the tank during vehicle operations. Without regular purging of the evaporative emission system, normal vaporization of the liquid fuel in the tank will cause the tank to become pressurized above atmospheric pressure. Prior to a refueling event, fuel tank vapor needs to be vented to the fuel vapor canister in order to prevent evaporative emissions via the fuel filler neck. Further, an overpressurized tank could result in liquid fuel splashing out of the tank when opened.

In order to lower the fuel tank pressure to atmospheric pressure prior to refueling and therefore prevent fuel vapors from escaping into the atmosphere, HEVs come equipped with a dashboard-mounted refuel request button that a driver must press prior to refueling. Requesting a refueling event triggers a controller to open the fuel tank isolation valve, depressurizing the fuel tank prior to allowing access to the fuel filler neck. However, the location of these refuel request buttons on the dashboard is unintuitive and inconvenient. If a driver forgets to press the button prior to exiting the vehicle at the refueling station, he or she must re-enter the vehicle in order to prepare the vehicle for refueling. Further, a refueling operator approaching the refueling door from the outside of the vehicle has no control over the tank depressurization process.

The inventors herein have recognized the above described problems, and have developed systems and methods to at least partially address these issues. In one example, a method for a vehicle, comprising: depressurizing a fuel tank while restricting access to a fuel fill line responsive to receiving a refueling request from a refueling request module located external to a vehicle cabin; and allowing access to the fuel fill line responsive to the fuel tank pressure decreasing below a threshold. In this way, all of the steps of a refueling procedure can be carried out entirely outside of a vehicle.

In another example, a fuel system for a vehicle, comprising: a fuel tank; a refueling inlet configured to receive a fuel dispensing nozzle; a fuel fill line coupled between the refueling inlet and the fuel tank; a refueling door located in a body panel of the vehicle and configured to restrict access to the refueling inlet; a refueling lock coupled to the refueling door; and a controller configured with instructions stored in non-transitory memory, that when executed, cause the controller to: responsive to the refueling door being displaced inwards, initiate a fuel tank depressurization sequence while maintaining the refueling door locked; and then allow access to the fuel fill line responsive to the fuel tank depressurizing below a pressure threshold. In this way, all of the refueling hardware can be located in one area. This in turn reduces the complexity and cost of the design.

In yet another example, a method for a vehicle, comprising: receiving a voltage signal from a potentiometer indicating a refueling request, the refueling request comprising an operator inwardly pressing a refueling door configured to engage the potentiometer; depressurizing a fuel tank while maintaining the refueling door locked; unlocking the refueling door when a fuel tank pressure is below a pressure threshold; receiving a voltage signal from the potentiometer indicating the refueling door is open; receiving a voltage signal from the potentiometer indicating the refueling door is closed; and sealing the fuel tank and locking the refueling door responsive to receiving the voltage signal from the potentiometer indicating the refueling door is closed. In this way, a refueling operator may simply push in the refueling door in order to begin the refueling process.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically shows an example vehicle propulsion system.

FIG. 2 schematically shows an example vehicle system with a fuel system and an emissions control system.

Figure 2:
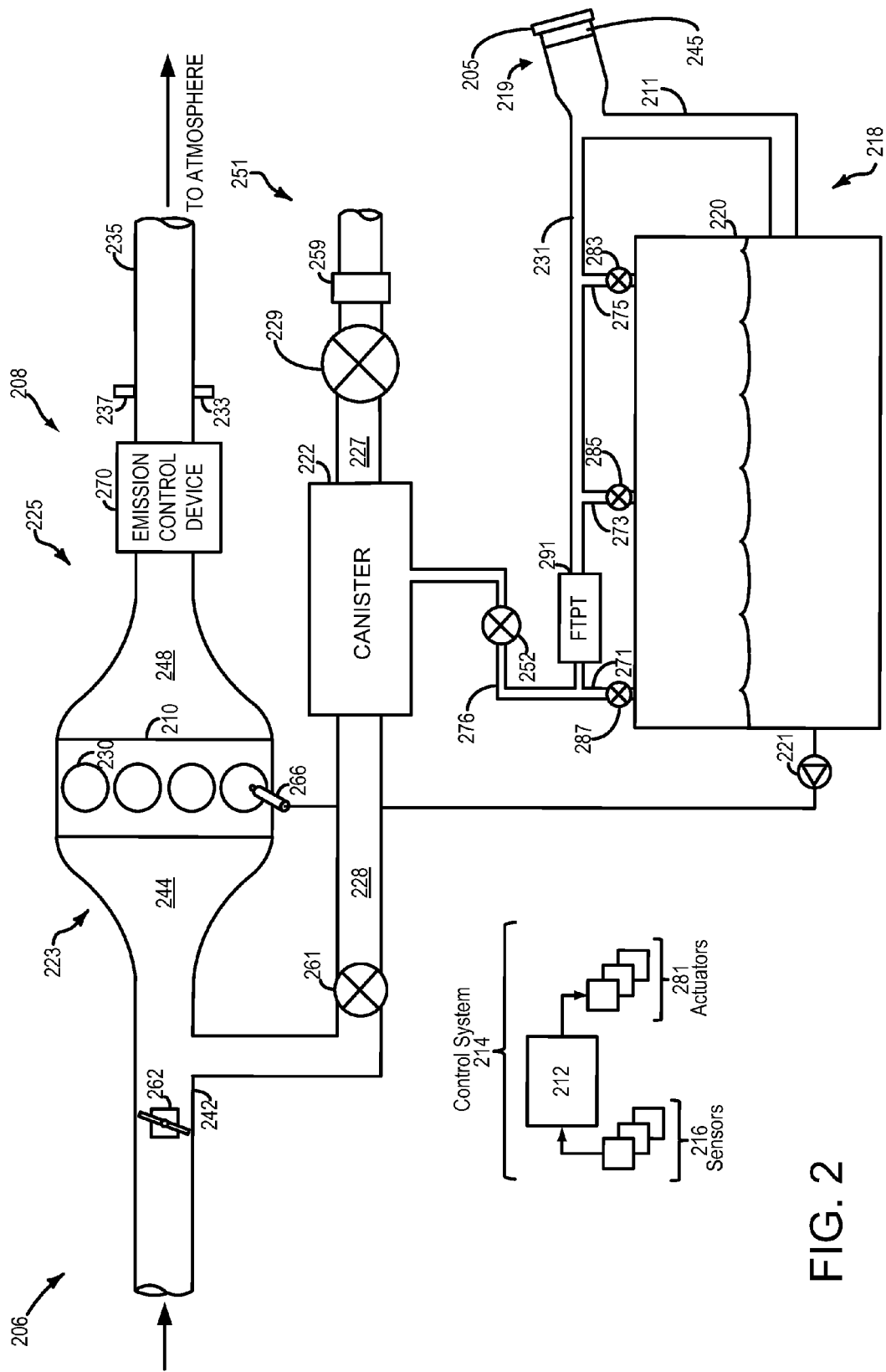
Figure 4:
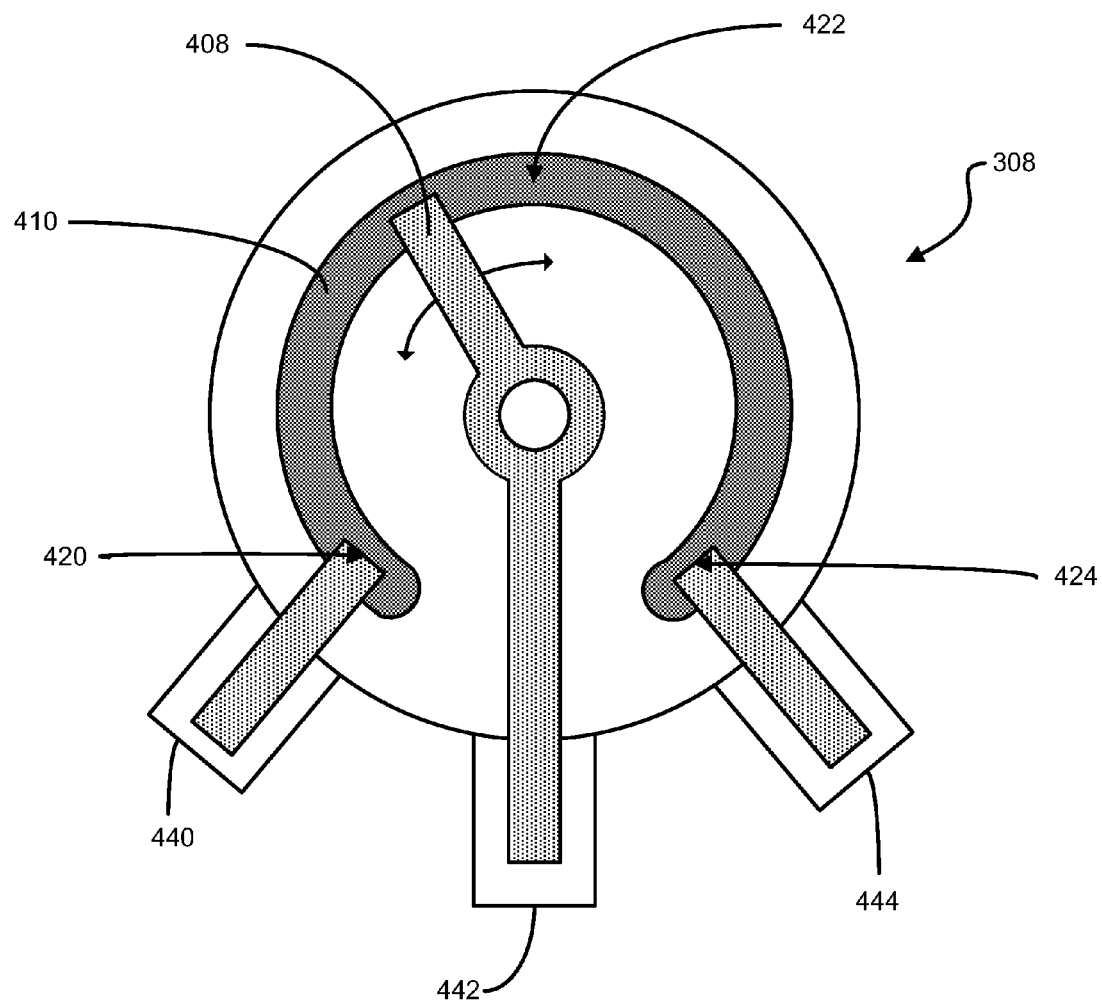

FIG. 4 schematically shows an example of a refuel request potentiometer switch that may be included in the fuel system of FIG. 2.

Figure 5:
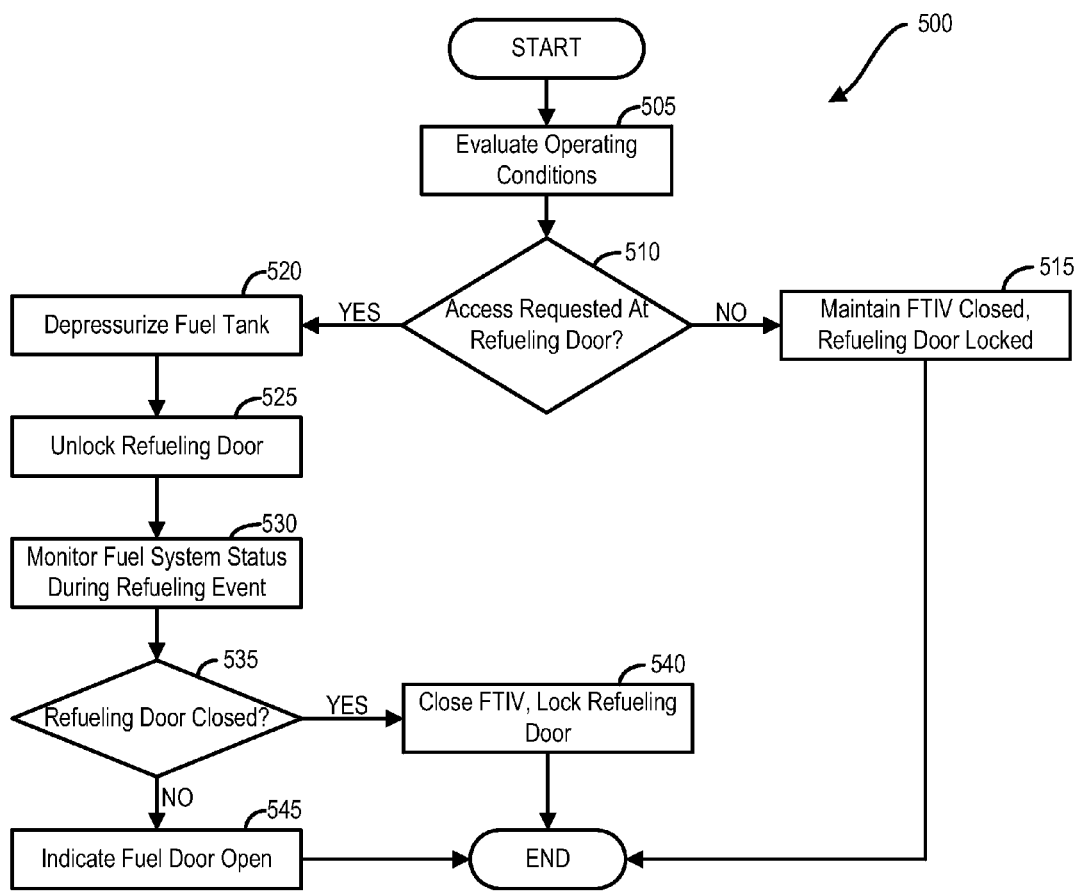

FIG. 5 depicts a flow chart for an example high-level method for depressurizing a fuel tank in response to a tank refueling request.

Figure 6:
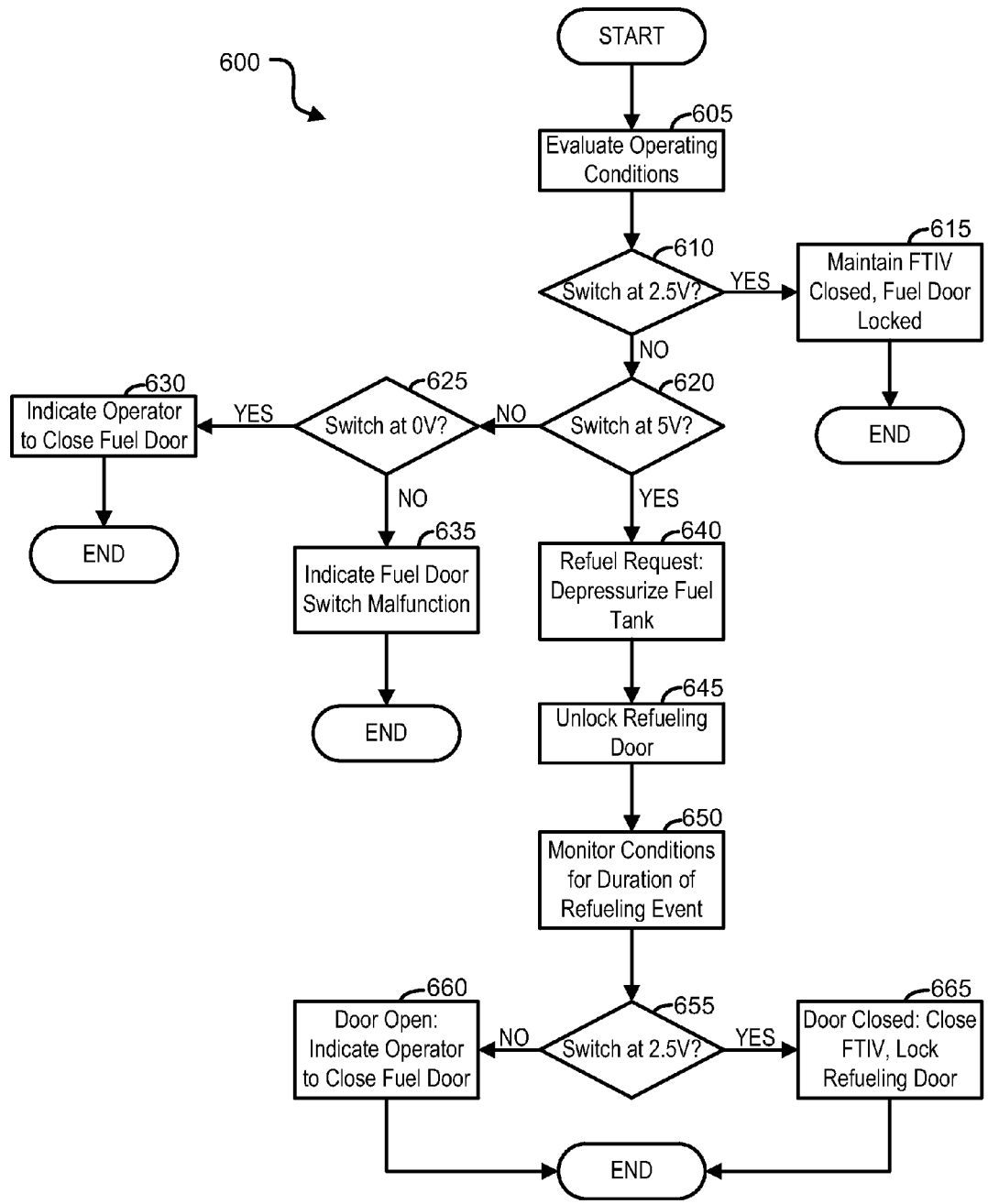

FIG. 6 depicts a flow chart for an example high-level method for using a potentiometer switch to control depressurizing a fuel tank in response to a tank refueling request.

Figure 7:
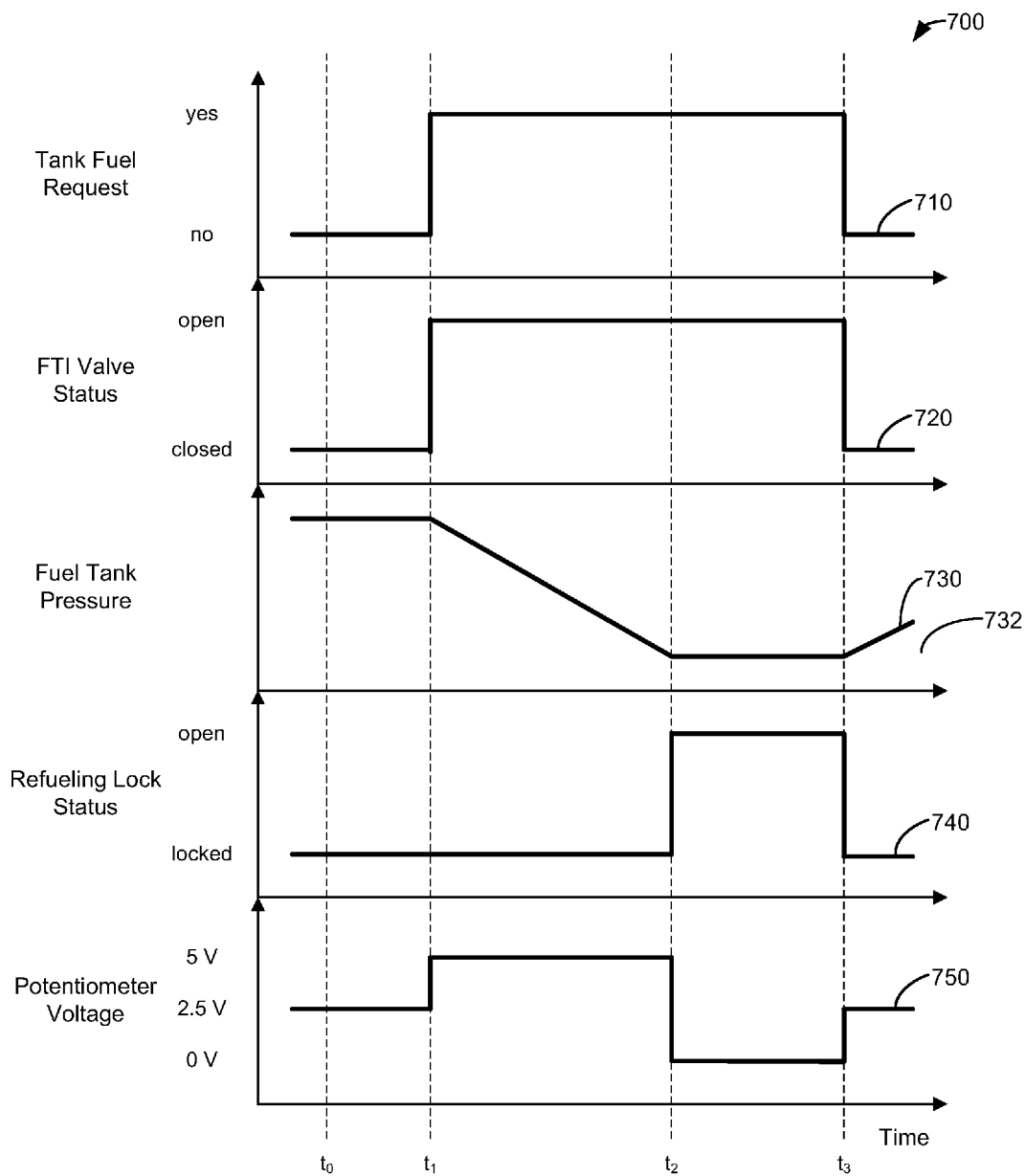

FIG. 7 shows an example timeline for depressurizing a fuel tank in response to a tank refueling request using the method depicted in FIG. 6.

Figure 8:
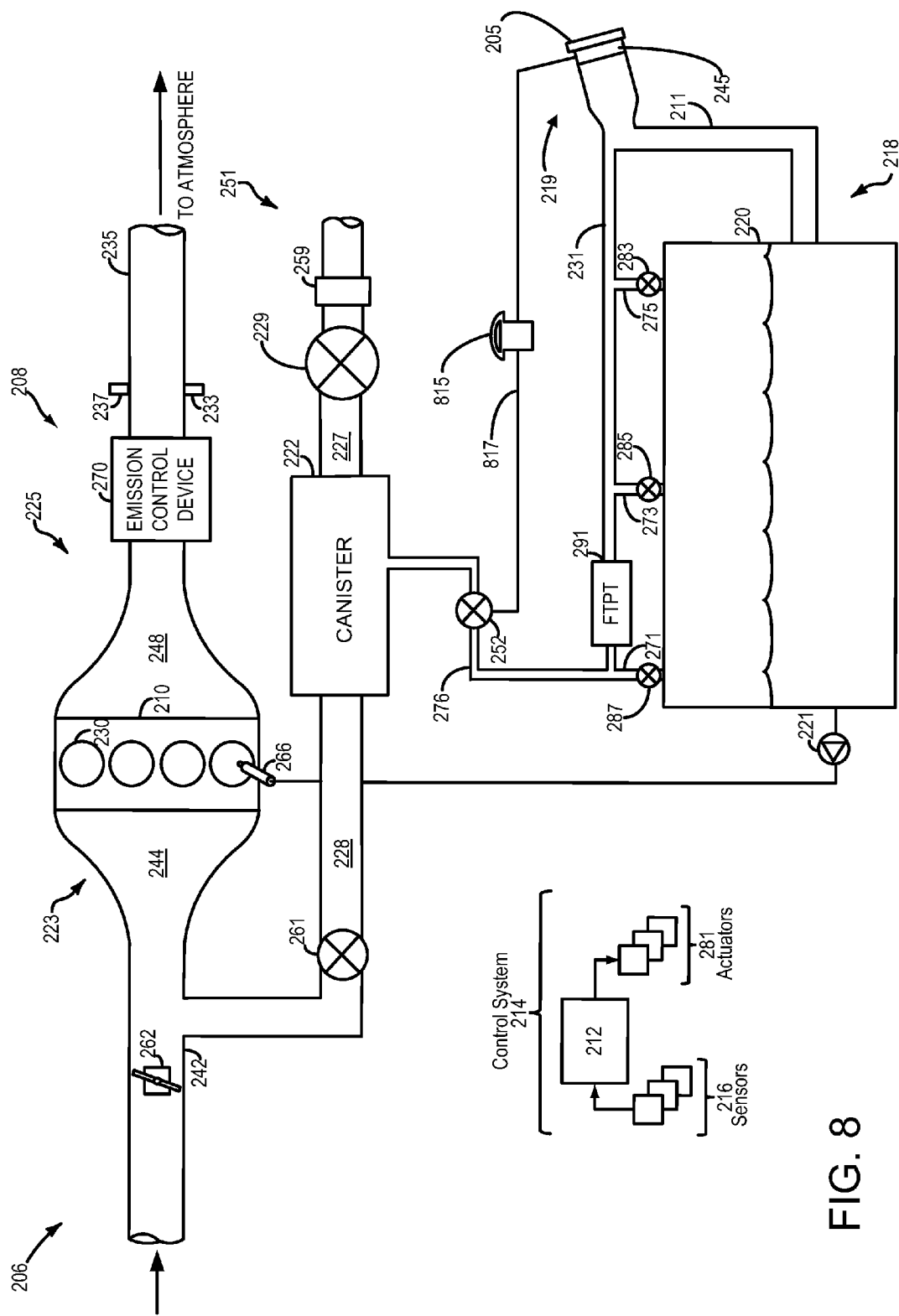

FIG. 8 schematically shows the example vehicle of FIG. 2 with an emergency manual refueling release cable.

Figure 9:
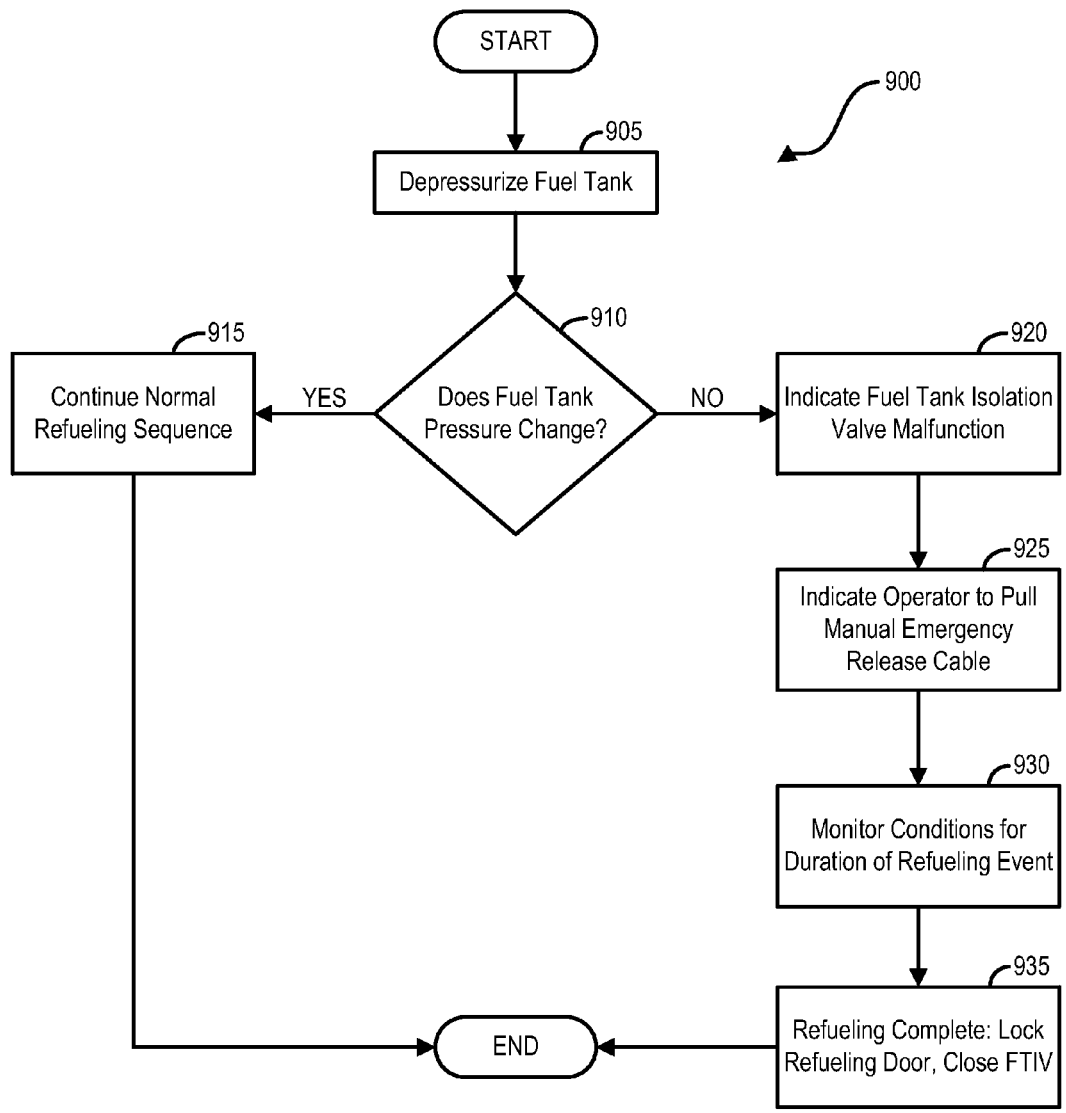

FIG. 9 depicts flow chart for an example high level method for using an emergency manual refueling release cable during a refueling event.

DETAILED DESCRIPTION

Figure 3A:
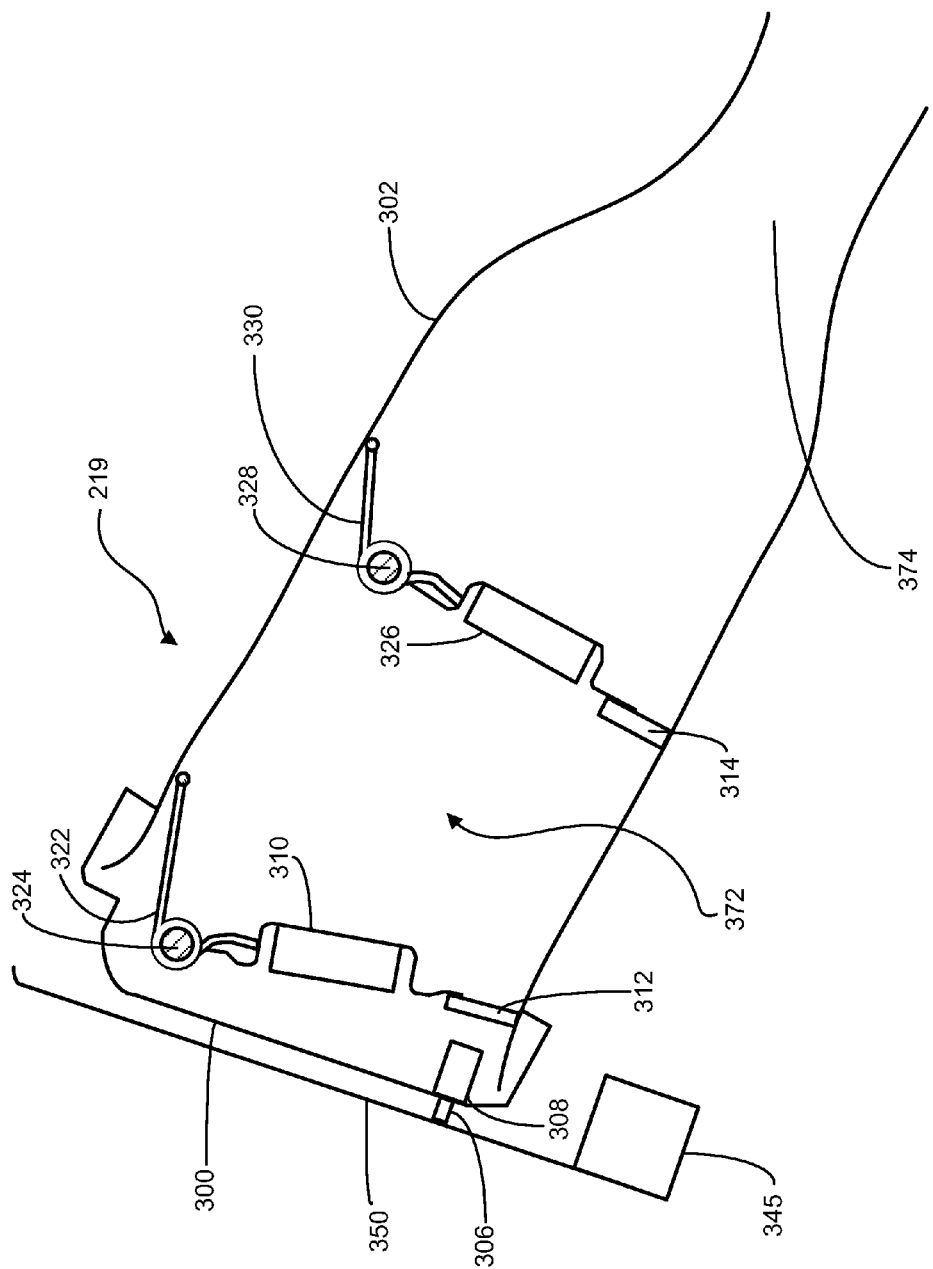
FIG. 3A shows a side perspective of an example illustration of a capless refueling assembly that may be included in the fuel system of FIG. 2.
Figure 3B:
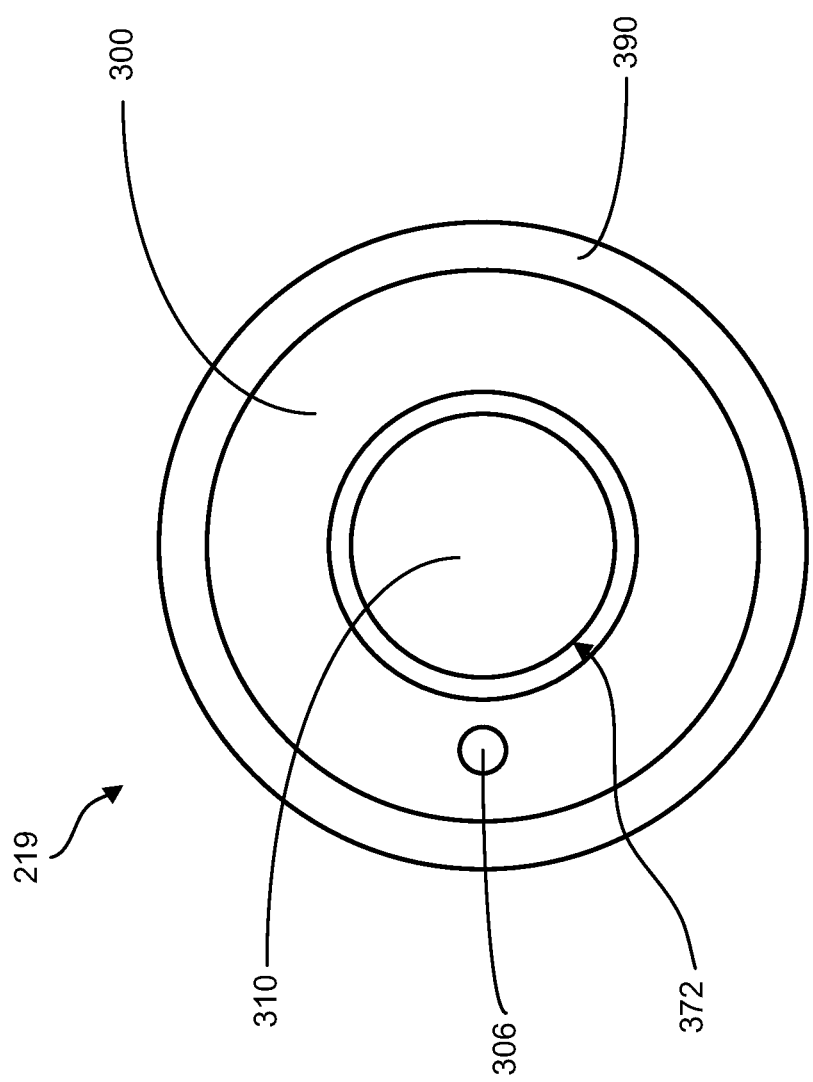
FIG. 3B shows a head-on perspective of an example illustration of a capless refueling assembly that may be included in the fuel system of FIG. 2.

The present description is related to refueling a vehicle. Specifically, methods and systems for an externally accessible refueling request switch are described. The refueling request switch may be located at or near the refueling door of a vehicle. The systems and methods may be implemented in a hybrid vehicle including a fuel system, such as the hybrid vehicle and fuel system depicted in FIG. 1. The vehicle may include a fuel system and an emissions control system as depicted in FIG. 2. The fuel system may include a capless refueling assembly, such as the capless refueling assembly depicted in FIGS. 3A and 3B. Access to the capless refueling assembly may be regulated by a locking refueling door, as shown in FIG. 3A. The capless refueling assembly may be further configured with an indicator LED as shown in FIG. 3B. The fuel system may also include a refuel request potentiometer switch as depicted in FIG. 4. Depressurizing a fuel tank in response to a refueling request may be controlled as shown in the sequence of FIG. 5. Depressurizing a fuel tank in response to a refueling request performed by a potentiometer switch may be controlled as shown in the sequence of FIG. 6. Example timelines for refueling events following a refuel request are shown in FIG. 7. In the event of a fuel system control malfunction, manual control of the fuel system may be possible with a vehicle including an emergency release cable as depicted in FIG. 8. The emergency release cable may be utilized during a refueling sequence using the method shown in FIG. 9.

Figure 1:
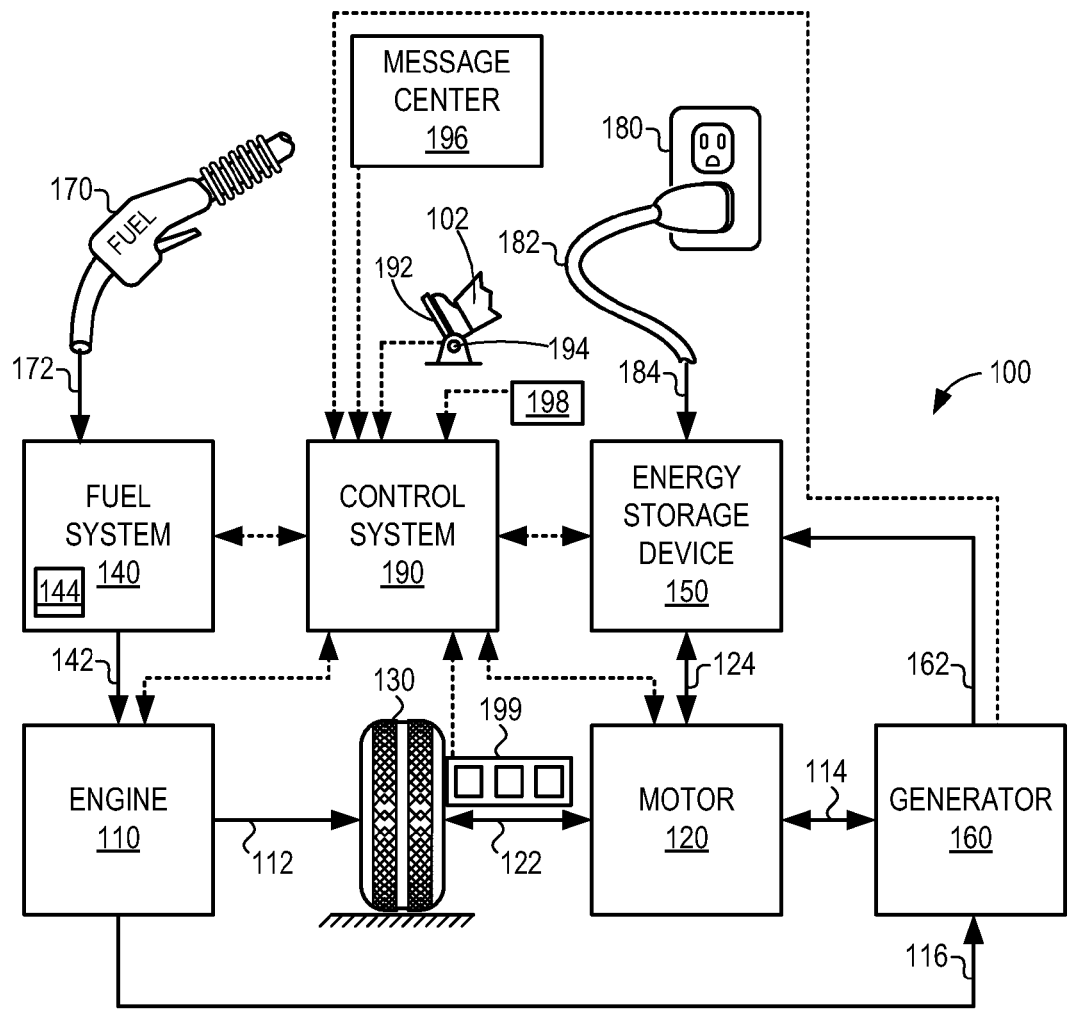

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge the energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. For example, as described in more detail below, the vehicle instrument panel 196 may include a text-based display which may indicate an open refueling door or a non-functional refueling door switch. The vehicle instrument panel 196 may also include various input portions for receiving an operator input, such as buttons, touch screens, voice input/recognition, etc.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel systems.

Vapors generated in fuel system 218 may be routed to an evaporative emissions control system 251 which includes a fuel vapor canister 222 via vapor recovery line 231, before being purge to the engine intake 223. Vapor recovery line may be coupled to fuel tank 220 via one or more conduits and may include one or more valves for isolating the fuel tank during certain conditions. For example, vapor recovery line 231 may be coupled to fuel tank 220 via one or more of a combination of conduits 271, 273, and 275.

Further, in some examples, one or more fuel tank vent valves may be included in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system 219 may include a refueling access seal 205 for sealing off the fuel filler system from the atmosphere. Refueling system 219 is coupled to fuel tank 220 via a fuel fill line or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the refueling access seal 205 may be configured as a fuel cap, and may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel fill line 211. In such embodiments, refueling lock 245 may not prevent the removal of a fuel cap. Rather, refueling lock 245 may prevent the insertion of a refueling pump into fuel fill line 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door may be electrically locked, for example by a solenoid, or mechanically locked, for example by a pressure diaphragm. In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

In some embodiments, refueling system 219 may be a capless design. In such embodiments, refueling access seal 205 may be considered a refueling access door located in the body panel of the vehicle and refueling lock 245 may lock the refueling access door. Refueling lock 245 may operate as described in the above examples. An example of a capless refueling system with a refueling door locking mechanism is described further herein and with regards to FIG. 3.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve 229 may be a normally open valve, so that fuel tank isolation valve (FTIV) 252 may control venting of fuel tank 220 with the atmosphere. FTIV 252 may be a normally closed valve that when opened allows for the venting of fuel vapors from fuel tank 220 to canister 222. Fuel vapors may then be vented to atmosphere via canister vent valve 229, or purged to engine intake system 223 via canister purge valve 261.

Fuel system 218 and emission control system 251 are linked by FTIV 252. FTIV 252 may be coupled between fuel tank 220 and canister 222 within conduit 276. FTIV 252 may be actuated during engine-on conditions to decrease the pressure in fuel tank 220 by venting fuel vapor to canister 222. During refueling events, FTIV 252 may be utilized to decrease the pressure in fuel tank 220 to a threshold. FTIV 252 may be positioned between the fuel system and the evaporative emissions system, the FTIV 252 configured to isolate the fuel tank from the purge when closed. FTIV 252 may be configured to isolate the fuel tank 220 from the evaporative emissions system when closed, such that no other valve may be opened to fluidly couple the fuel system to the evaporative emissions system. FTIV 252 may be configured to isolate the fuel system from the evaporative emissions system when closed and further configured to partially open during fuel tank purging conditions and configured to completely open during refueling conditions. FTIV 252 may be further configured to isolate refueling vapors from diurnal vapors while closed.

The vehicle system 206 may further include a control system 214. Control system 214 is shown receiving information from a plurality of sensors 216 (various examples of which are described herein). As one example, sensors 216 may include exhaust gas sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 252, pump 292, and refueling lock 245. The control system 214 may include a controller 212. The controller may receive input data from the various sensors, process the input data, and trigger the actuators in response to the processed input data based on instruction or code programmed therein corresponding to one or more routines. Control system 214 may be configured with instructions stored in non-transitory memory that cause controller 212 to perform control routines via one or more actuators 281 based on information received via one or more sensors 216. Example control routines are described herein and with regards to FIGS. 5, 6, and 9.

FIG. 3 shows an example of refueling assembly 219 configured with a capless refueling assembly. Refueling assembly 219 includes a cover 300. The cover 300 is configured to enclose components in the assembly. The refueling assembly further includes an external housing 302 configured to at least partially enclose various internal components of the refueling assembly 219. The refueling assembly 219 further includes an upstream door 310 having a hinge 324. The upstream door 310 is inset from the cover 300. A preloaded upstream spring 322 may be coupled to the upstream door 310 and the external housing 302. The preloaded upstream spring 322 is coupled to the upstream door 310 providing a return force to the door when opened. The upstream spring 322 is configured to provide a return force when the upstream door 310 is depressed via a fuel nozzle. The upstream spring 322 may be a passive spring with a fixed return force, or may be coupled to a solenoid configured to provide a greater return force when the solenoid is active. In this way, the upstream door 310 may close after a fuel nozzle is removed during a refueling event. Thus, the upstream door 310 automatically closes without assistance from a refueling operator. As a result, the refueling process is simplified.

A seal 312 may be attached to the upstream door 310. Specifically, the seal 312 may extend around the periphery of the upstream door 310, in some examples. When the upstream door 310 is in a closed position the seal may be in face sharing contact with the cover 300. In this way, the evaporative emissions from the refueling assembly 219 are reduced.

The refueling assembly 219 further includes a downstream door 326 positioned downstream of the upstream door 310. The downstream door 326 includes a hinge 328 and has a preloaded downstream spring 330 coupled thereto. The preloaded downstream spring 330 is coupled to the downstream door 326 providing a return force to the downstream door 326 when opened. The downstream spring 330 is also coupled to the external housing 302. The downstream spring 330 is configured to provide a return force to the downstream door 326 when the downstream door 326 is in an open position. The downstream spring 330 may be a passive spring with a fixed return force, or may be coupled to a solenoid configured to provide a greater return force when active. The downstream door 326 may also include a seal 314 (e.g., flap seal). The seal 314 may be positioned around the periphery of the downstream door 326, in some examples. The downstream door 326 enables the evaporative emissions during the refueling process to be further reduced. The downstream door 326 is arranged perpendicular to the fuel flow when closed, in the depicted example. However, other orientations of the downstream door 326 are possible.

Refueling assembly 219 includes filler pipe 374. Filler pipe 374 is in fluidic communication with fuel tank 220 via fuel fill line 211, as shown in FIG. 2. Refueling assembly 219 may further include a flow guide (not shown) which is arranged downstream of downstream door 326. Flow guide may be at least partially enclosed by filler pipe 374. The refueling assembly 219 is configured such that a fuel dispensing nozzle 170 may be inserted into the refueling inlet 372, thereby pushing in the upstream door 310 as well as the downstream door 326.

Refueling assembly includes a refueling door 350 which may be located in a body panel of the vehicle, inset such that the refueling door is flush with the body panel when closed. Refueling door 350 is coupled to a refueling door lock 345. Refueling door lock 345 may be a latch or a clutch which locks a refueling door 350. The refueling door 350 may be electrically locked, for example by a solenoid, or mechanically locked, for example by a pressure diaphragm.

In embodiments where refueling lock 345 is locked using an electrical mechanism, refueling lock 345 may be unlocked by commands from controller 212, for example, when a fuel tank pressure decreases below a pressure threshold. In embodiments where refueling lock 345 is locked using a mechanical mechanism, refueling lock 345 may be unlocked via a pressure gradient, for example, when a fuel tank pressure decreases to atmospheric pressure.

Refueling assembly 219 includes a refuel request button 306 coupled to a refueling door switch 308. Refuel request button 306 may be located on the refueling assembly cover 300, the refuel request button configured to be depressed when a refueling operator pushes the refueling door 350 towards the refueling assembly. Refueling door switch 308 may be a spring-loaded potentiometer configured with states corresponding to refueling stages as described further herein and with regards to FIG. 4.

FIG. 3B shows a head-on view of a capless refueling assembly 219. As described in FIG. 3A, refueling assembly 219 may include a refueling assembly cover 300, a refuel request button 306, and an upstream door 310. The refueling assembly 219 is configured such that a fuel dispensing nozzle 170 may be inserted into the refueling inlet 372, thereby pushing in the upstream door 310 as well as the downstream door 326. In addition, refueling assembly 219 may include an LED display 390. LED display 390 may be comprised of discrete LED lights closely packed together, or may be comprised of a continuous strip of LEDs. LED display 390 may encircle the refueling assembly 219. LED display 390 may be configured to dynamically indicate the status of fuel tank depressurization during a refueling event. For example, LED display 390 may illuminate red upon a refuel request to indicate the ongoing fuel tank depressurization, and may illuminate green when the fuel tank pressure has dropped below a threshold and the refueling lock 345 is unlocked. In this way, LED display 390 may notify a refueling operator that refueling may begin. LED display 390 may continue to illuminate green during refueling. LED display 390 may blink red while the refueling door 350 is open upon completion of refueling. LED display 390 may then turn off upon closing of the refueling door 350.

In some embodiments, during refueling LED display 390 may be configured to illuminate in proportion to the fuel level inside the fuel tank 220. That is, controller 212 may receive input data from a fuel level sensor inside of the fuel tank 220, process the input data, and illuminate a portion of LED display 390 equal to the fuel level inside the fuel tank 220. For example, if during refueling the fuel tank 220 is half full of fuel, half of the LED display 390 will illuminate. When the fuel tank is full of fuel, the entire LED display 390 will illuminate. In this way, refueling assembly 219 may convey to a refueling operator the fuel level status during refueling.

FIG. 4 shows a schematic depiction of an example refueling door switch 308 embodied as a potentiometer. The potentiometer 308 includes a resistive material 410. The potentiometer 308 includes a wiper 408 in contact with the resistive material 410 and moveable along the resistive material 410 between points 420 and 424. The potentiometer 308 has three terminals 440, 442, and 444. The wiper terminal 442 may be electrically connected to the controller 212 and the terminals 440 and 444 may be respectively connected to a voltage source and ground. The voltage supplied to terminal 440 may be considered a maximum, or total voltage (V). The electrical resistance between terminal 440 and terminal 444 may be considered a maximum, or total resistance (R).

In one embodiment, the wiper is in the middle position 422 when the refueling door 350 is closed such that the resistance between terminals 440 and 442 is half the total resistance R/2 and the voltage signal to the controller 212 is half the total voltage V/2. When the refueling operator presses on the refueling door 350 to signal a refueling request, the wiper moves to position 420 and there is zero resistance between terminals 440 and 442. At this point the controller 212 receives the full voltage signal V and opens the FTIV 252, thereby depressurizing the fuel tank 220. When the fuel tank pressure is below a threshold, the refueling door 350 is unlocked via the refueling door lock 345 to allow access to the refueling assembly 219. When the refueling operator opens the refueling door 350, the wiper moves to position 424 such that the resistance between terminals 440 and 442 is the total resistance R and the controller 212 receives no voltage signal. When refueling is complete and the refueling door is closed, the wiper moves to position 422 such that the resistance between terminals 440 and 442 is half the total resistance R/2 and the controller 212 receives the output voltage V/2, thereby closing the FTIV 252 and locking the refueling door 350.

In one embodiment, terminal 440 may be connected to a 5 volt source and terminal 444 may be connected to ground. When the refueling door is closed and not pressed in, the potentiometer wiper 408 is in the middle position 422 and subsequently the voltage at terminal 442 is 2.5 volts. When the refueling door 350 is pressed in, the wiper 408 moves to position 420 and subsequently the voltage at terminal 442 is 5 volts. When the refueling door 350 is opened, the wiper 408 moves to position 424 and subsequently the voltage at terminal 442 is 0 volts. Terminal 442 may be coupled to the controller 212, controller 212 configured to interpret the voltage at terminal 442 as described above.

Hence, a refueling request module may be comprised of a refueling button 306 and a potentiometer 308. The refueling request module may be coupled to the controller 212, the controller 212 configured to interpret voltage signals from the potentiometer 308 as stages of a refueling event. To initiate a refueling request, an operator may press on the refueling door 350 such that the refueling door 350 is displaced inwards. As the refueling door displaces inwards, the refueling button 306 displaces inwards. An inwards displacement of the refueling button 306 initiates a positive displacement of the potentiometer 308, and the potentiometer 308 thereby outputs a full voltage signal to the controller 212. After the refueling door 350 is unlocked and the refueling door 350 is opened, the refueling button 306 displaces outwards. An outward displacement of the refueling button 306 initiates a negative displacement of the potentiometer 308, and the potentiometer 308 thereby outputs a zero voltage signal to the controller 212. After the refueling door 350 is closed, the refueling button 306 returns to a neutral position. A return to the neutral position of the refueling button 306 initiates a neutral displacement of the potentiometer 308, and the potentiometer 308 thereby outputs a half voltage signal to the controller 212.

FIG. 5 shows a high-level flow chart for an example method 500 for a refueling event in accordance with the current disclosure. In particular, method 500 relates to a refueling request performed outside of the vehicle at the refueling door. Method 500 will be described herein with reference to the components and systems depicted in FIGS. 1, 2, and 3, though it should be understood that the method may be applied to other systems without departing from the scope of this disclosure. Method 500 may be carried out by controller 212, and may be stored as executable instructions in non-transitory memory.

Method 500 may begin at 505. At 505, method 500 may include evaluating operating conditions. Operating conditions may include, but are not limited to, refueling door lock status, fuel fill level, canister load level, engine operating status, fuel tank pressure, vehicle location (as determined through an on-board GPS, for example), etc. Operating conditions may be measured by one or more sensors 216 coupled to controller 212, or may be estimated or inferred based on available data.

Continuing at 510, method 500 may include determining whether a refueling event is imminent. Determining whether a refueling event is imminent may include detecting a refueling request at the refueling door 350. For example, a refuel request may comprise a vehicle operator depression of a refueling request button 306 located on the refueling assembly cover 300. The refueling request button 306 may be located on the refueling assembly cover 300 such that the refueling request button 306 may be depressed by the vehicle operator pushing in the refueling door 350. In another example, a refuel request may comprise a vehicle operator depression of a button external to the refueling door. In another example, the refueling door may be open and the refuel request may comprise pressing a button located on the refueling assembly cover 300 or next to the refueling inlet. In another example, a refuel request may comprise turning a fuel cap. Thus, the refuel request may include manually requesting opening of a fuel cap coupled to the fuel tank. In other examples, determining whether a refueling event is imminent may include detecting proximity to a refueling station. For example, the vehicle's proximity to a refueling station may be determined via an on-board GPS or through wireless communication between the vehicle and a refueling pump. In another example, the operator may request directions to a refueling station via the on-board GPS. In another example, a refueling event may be inferred by the vehicle operator (or a refueling attendant) opening a refueling door or otherwise attempting to gain access to refueling assembly 219.

If it is determined that no refueling request is imminent, method 500 may proceed to 515. At 515, method 500 may include maintaining the FTIV 252 closed and the refueling door lock 345 locked. Method 500 may then end. If it is determined that a refueling event is imminent, method 500 may proceed to 520. At 520, method 500 may include depressurizing the fuel tank 220. Depressurizing the fuel tank 220 may include opening the FTIV 252. In this way, fuel vapor currently stored in fuel tank 220 may be vented to canister 222, and subsequent fuel vapor generated during the refueling event may also be vented to canister 222. Air stripped of fuel vapor may exit canister 222 to atmosphere through vent 227.

Once the fuel tank pressure is below a predetermined threshold, method 500 may proceed to 525.

Continuing at 525, method 500 may include allowing access to the refueling inlet following depressurization of the fuel tank 220. In one example, allowing access to the refueling inlet may comprise unlocking the refueling door 350. The refueling lock 345 may be a latch or a clutch coupled to the refueling door 350. The refueling door 350 may be electrically locked, for example by a solenoid, or mechanically locked, for example by a pressure diaphragm. In embodiments where refueling lock 345 is locked using an electrical mechanism, refueling lock 345 may be unlocked by commands from controller 212, for example, when a fuel tank pressure decreases below a pressure threshold. In embodiments where refueling lock 345 is locked using a mechanical mechanism, refueling lock 345 may be unlocked via a pressure gradient, for example, when a fuel tank pressure decreases to atmospheric pressure. In another example, allowing access to the refueling inlet may comprise unlocking a fuel cap, the fuel cap locked by a refueling lock 345. In another example, allowing access to the refueling inlet may comprise unlocking a first and/or second flap in a capless refueling assembly, the first and/or second flap locked by a refueling lock 345. Once access to the refueling inlet is allowed, method 500 may then proceed to 530.

At 530, method 500 may include monitoring the fuel system status during a refueling event. Monitoring the refueling status may include monitoring the fuel fill level, monitoring the fuel tank pressure, detecting presence of fuel dispenser nozzle in the refueling neck, etc. The refueling event may be considered to be ended when, for example, the fuel level does not change for some predetermined amount of time, an automatic shutoff event occurs, the fuel dispensing nozzle is removed, etc. Method 500 may then proceed to 535.

At 535, method 500 may include determining if the refueling door is closed. Controller 212 may allow for a predetermined amount of time to elapse from the end of the refueling event until determining whether the refueling door is closed to allow the refueling operator to replace the refueling nozzle and refueling cap, if included. If the refueling door is determined to be closed, method 500 may proceed to 540. At 540, method 500 may include closing the FTIV and locking the refueling door. Method 500 may then end. If the refueling door is determined to not be closed after the predetermined duration following the end of the refueling event, method 500 may proceed to 545. At 545, method 500 may include indicating that the fuel door is open. Indicating that the fuel door is open may include displaying a message on the vehicle dashboard, illuminating an LED at or near the refueling door, sounding an audible alarm, etc. Method 500 may then end.

FIG. 6 shows a high-level flow chart for an example method 600 for a refueling event in accordance with the current disclosure. In particular, method 600 relates to performing a refueling request by pressing in the refueling door such that a spring-loaded potentiometer is depressed. Method 600 will be described herein with reference to the components and systems depicted in FIGS. 1, 2, 3, and 4, though it should be understood that the method may be applied to other systems without departing from the scope of this disclosure. Method 600 may be carried out by controller 212, and may be stored as executable instructions in non-transitory memory.

Method 600 may begin at 605. At 605, method 600 may include evaluating operating conditions. Operating conditions may include, but are not limited to, fuel fill level, canister load level, engine operating status, fuel tank pressure, vehicle location (as determined through on-board GPS, for example), etc. Operating conditions may be measured by one or more sensors 216 coupled to controller 212, or may be estimated or inferred based on available data.

Continuing at 610, method 600 may include determining if the potentiometer switch 308 voltage is 2.5 volts at terminal 442. As described herein and with regards to FIG. 4, the voltage difference between terminals 440 and 444 may be 5 volts such that the voltage at terminal 442 is 5 volts when the wiper is at position 420, 2.5 volts when the wiper is at position 422, and 0 volts when the wiper is at position 424. These positions may correspond to different states of the door, for example, 2.5 volts when the refueling door is closed and no refuel request is made, 5 volts when the refueling door is pressed in and a refuel request is made, and 0 volts when the refueling door is open. As such, a voltage of 2.5 volts at terminal 442 indicates that the switch is in equilibrium position 422. Equilibrium position 422 refers to a state of the switch when there is no refuel request and the refueling door 350 is closed. Therefore, if the switch is at 2.5 volts, then no refuel request has been made. If the switch is not at 2.5 volts, further steps described herein must be taken.

If it is determined that the potentiometer switch voltage is 2.5 volts, method 600 may proceed to 615. At 615, method 600 may include maintaining the FTIV 252 closed and the refueling door lock 345 locked. Method 600 may then end. If it is determined that the potentiometer switch voltage is not 2.5 volts, method 600 may proceed to 620. At 620, method 600 may include determining if the potentiometer switch voltage is 5 volts. If the potentiometer switch voltage is 5 volts, then the refueling door has been pressed in and a refueling request has been performed. However, if the potentiometer switch voltage is not 5 volts, method 600 may then proceed to 625.

At 625, method 600 may include determining if the potentiometer switch voltage is 0 volts. If the switch voltage is 0 volts, then the refueling door is open. Method 600 may then proceed to 630. At 630, method 600 may include indicating to the operator to close the refueling door. Indicating to the operator to close the refueling door may comprise displaying a message on the vehicle dashboard, illuminating an LED at or near the refueling door, sounding an audible alarm, etc. Method 600 may then end. Returning to 625, if the switch voltage is not 0 volts and the switch voltage was determined at 610 and 620 to not be 2.5 volts or 5 volts, then the potentiometer switch has malfunctioned. Method 600 may then proceed to 635. At 635, method 600 may include indicating a fuel door switch malfunction. Indicating a fuel door switch malfunction may comprise displaying a message on the vehicle dashboard, illuminating an LED or LED ring at or near the refueling door, sounding an audible alarm, etc. Method 600 may then end.

Returning to 620, if the switch voltage is determined to be 5 volts, method 600 may then proceed to 640. At 640, method 600 may include depressurizing the fuel tank 220. Depressurizing the fuel tank 220 may include opening the FTIV 252. In this way, fuel vapor currently stored in fuel tank 220 may be vented to canister 222, and subsequent fuel vapor generated during the refueling event may also be vented to canister 222. Air stripped of fuel vapor may exit canister 222 to atmosphere through vent 227. Once the fuel tank pressure is below a predetermined threshold, method 600 may proceed to 645.

Continuing at 645, method 600 may include unlocking the refueling door 350 following depressurization of the fuel tank 220. The refueling door 350 may be electrically locked, for example by a solenoid, and may be unlocked by commands from controller 212. Once the refueling door is unlocked, method 600 may then proceed to 650.

At 650, method 600 may include detecting that the refueling door is open as an indication that a refueling event is imminent. Detecting that the refueling door is open may include detecting that the potentiometer switch voltage is 0 volts. The potentiometer switch voltage is 0 volts when the refueling door opens and the spring of the potentiometer switch subsequently pushes the potentiometer wiper along the full length of the resistive material 410 to position 424. Method 600 may then proceed to 655.

At 655, method 600 may include determining if the refueling door has been closed, i.e., the switch voltage is at 2.5 volts. If the switch voltage is not at 2.5 volts, the refueling door is open and method 600 may proceed to 660. At 660, method 600 may include indicating to the operator to close the refueling door. Indicating to close the refueling door may comprise displaying a message on the vehicle dashboard, illuminating an LED or LED ring at or near the refueling door, sounding an audible alarm, etc. Method 600 may then end. Returning to 655, if the switch voltage is at 2.5 volts, the refueling door is closed. Method 600 may then proceed to 665. At 665, method 600 may include closing the FTIV to seal the fuel tank and locking the refueling door to prevent access to the refueling inlet. Method 600 may then end.

FIG. 7 shows an example timeline for refueling using the method described herein and with regards to FIG. 6. Timeline 700 includes plot 710, indicating the status of a tank refueling request over time. Timeline 700 also includes plot 720, indicating the status of a fuel tank isolation (FTI) valve over time; plot 730, indicating the pressure inside a fuel tank over time; plot 740, indicating the status of a refueling door lock over time; and plot 750, indicating the output voltage of the potentiometer switch over time. Line 732 represents a threshold for fuel tank pressure.

At time $t_0$, no tank refuel request is indicated, as shown by plot 710. As such, the status of the FTI valve and the refueling door lock are maintained. As shown by plots 720 and 740, the valve is closed and the lock is locked at time $t_0$ and thus are maintained closed and locked. As shown by plot 750, the potentiometer switch is in an equilibrium position and so the potentiometer switch voltage is maintained at 2.5 volts.

At time $t_1$, a refueling request is received, as shown by plot 710. As shown by plot 750, the refueling request is performed by pushing in the refueling door such that the potentiometer resistance decreases to zero and the switch voltage increases to 5 volts. As shown by plot 730, the fuel tank pressure at time $t_1$ is greater than threshold 732. Thus, the FTIV is opened, as shown by plot 720. Additionally, the refueling lock is maintained in a locked conformation, as shown by plot 740.

From time $t_1$ to time $t_2$, the FTIV is open, allowing for fuel vapors to vent from the fuel tank to the evaporative emissions system. As such, the fuel tank pressure decreases, as indicated by plot 730. As respectively shown by plots 740 and 750, the refueling door is maintained in a locked conformation and the potentiometer switch voltage is maintained at 5 volts.

At time $t_2$, fuel tank pressure drops below threshold 732. In response to fuel tank pressure dropping below threshold 732, the refueling door is unlocked, allowing refueling to proceed. When the refueling door is open, the potentiometer switch voltage decreases to zero volts, as shown by plot 750.

At time $t_3$, refueling is complete and the refueling door is closed. As shown by plots 750 and 710, the potentiometer switch voltage returns to 2.5 volts, ending the tank fuel request. As shown by plots 720 and 740, the FTIV is closed and the refueling door is locked. The fuel tank, now isolated, becomes pressurized.

If the refueling door locking solenoid and/or the fuel tank isolation valve malfunctions, the vehicle will not be able to be refueled. A system and method for manually preparing the fuel system for refueling is described herein and with respect to FIGS. 8 and 9.

FIG. 8 shows the vehicle system 206 of FIG. 2 with the addition of a rip cord 815 and an emergency manual release cable 817. Rip cord 815 may be coupled to the FTIV 252 and the refueling door lock 345 via an emergency manual release cable 817. Rip cord 815 may be located in the trunk of the vehicle. If the refueling door locking solenoid 345 or the FTIV 252 does not work, a refueling operator may pull on the rip cord 815 to manually unlock the refueling door 350 and open the FTIV 252, thereby depressurizing the fuel tank and allowing refueling to occur.

FIG. 9 shows a high-level flow chart for an example method 900 for using the manual emergency release cable 817 during a refueling event in accordance with the current disclosure. In particular, method 900 relates to manually depressurizing the fuel tank and unlocking the refueling door in the event of a valve and/or lock malfunction. Method 900 will be described herein with reference to the components, systems, and methods depicted in FIGS. 1, 2, 3, 5, and 6, though it should be understood that the method may be applied to other systems without departing from the scope of this disclosure. Method 900 may be carried out by controller 212, and may be stored as executable instructions in non-transitory memory.

Method 900 may be a subroutine of method 500 occurring at 520 or of method 600 occurring at 625. As such, method 900 begins at 905. At 905, method 900 may include depressurizing the fuel tank 220. Depressurizing the fuel tank may include opening the FTIV 252.

Continuing at 910, method 900 may include determining if the fuel tank pressure changes upon opening the FTIV 252. Determining if the fuel tank pressure changes may include, but is not limited to, monitoring the fuel tank pressure, canister load level, vapor flow rate, etc. If the fuel tank pressure changes, method 900 may proceed to 915. At 915, method 900 may include continuing the normal refueling sequence depicted in FIGS. 5 and 6. The subroutine method 900 may then end.

If the fuel tank pressure does not change, there may be a fuel tank isolation valve malfunction and method 900 may proceed to 920. At 920, method 900 may include indicating a FTIV malfunction to the user. Indicating a FTIV malfunction may include, but is not limited to, displaying an error message on the dashboard, turning on a light, playing a sound, etc.

Continuing to 925, method 900 may include indicating the operator to pull the manual emergency release cable rip cord 815. Indicating the operator to pull the rip cord 815 may include, but is not limited to, displaying a message on the dashboard, turning on a light, playing a sound, etc. The operator may then manually open the FTIV 252 and unlock the refueling door 350 by pulling the rip cord 815, the rip cord 815 coupled to the FTIV 252 and the refueling door lock 345 via the manual emergency release cable 817. Method 900 may then proceed to 930.

At 930, method 900 may include monitoring conditions for the duration of the refueling event. Conditions may include, but are not limited to, fuel fill level, fuel tank pressure, canister load level, refueling request potentiometer voltage, presence of fuel dispensing nozzle in the refueling neck, rate of fuel fill level change, etc. The controller may determine that the refueling event is complete based upon these conditions. For example, the controller may determine that the refueling event is complete by observing that the fuel fill level has stopped changing, the fuel dispensing nozzle has been removed from the fuel neck, and/or the refueling door has been closed thereby returning the refueling request potentiometer switch to equilibrium position. Method 900 may then proceed to 935.

At 935, method 900 may include locking the refueling door 350 and closing the FTIV 252. In this way, the fuel tank may be sealed to prevent fuel vapors from escaping to atmosphere. Method 900 may then end.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
   depressurizing a fuel tank while maintaining a lock coupled to a refueling door in a locked state responsive to receiving a refueling request from a refueling request module located external to a vehicle cabin;
   unlocking the refueling door lock responsive to the fuel tank pressure decreasing below a threshold pressure; and
   indicating to pull an emergency release cable responsive to the fuel tank not depressurizing below the threshold pressure, wherein the emergency release cable is coupled to a fuel tank isolation valve and the refueling door lock.

2. The method of claim 1, wherein receiving the refueling request from the refueling request module comprises detecting the refueling door in a pushed inward state.

3. The method of claim 1, wherein maintaining the refueling door lock in a locked state restricts access to a fuel fill line.

4. The method of claim 3, wherein unlocking the refueling door lock allows access to the fuel fill line.

5. The method of claim 1, further comprising:
receiving an indication that the refueling event has ended;
sealing the fuel tank; and
locking the refueling door to restrict access to a fuel fill line.

6. The method of claim 5, wherein receiving an indication that the refueling event has ended comprises detecting the refueling door in a closed state.

7. A fuel system for a vehicle, comprising:
a fuel tank;
a refueling inlet configured to receive a fuel dispensing nozzle;
a fuel fill line coupled between the refueling inlet and the fuel tank;
a refueling door located in a body panel of the vehicle and configured to restrict access to the refueling inlet;
a refueling lock coupled to the refueling door;
a controller configured with instructions stored in non-transitory memory, that when executed, cause the controller to:
responsive to the refueling door being displaced inwards, initiate a fuel tank depressurization sequence while maintaining the refueling door locked; and then
allow access to the fuel fill line responsive to the fuel tank depressurizing below a pressure threshold; and
an emergency release cable coupled to a fuel tank isolation valve and the refueling lock;
wherein the controller is further configured with instructions stored in non-transitory memory, that when executed, cause the controller to:
indicate to pull the emergency release cable responsive to the fuel tank not depressurizing below the pressure threshold.

8. The system of claim 7, the controller further configured with instructions stored in non-transitory memory, that when executed, cause the controller to:
responsive to the refueling door being displaced outwards, maintain the fuel tank depressurized and the refueling door unlocked; and then
responsive to the refueling door being closed, seal the fuel tank and lock the refueling door.

9. The system of claim 8, further comprising:
a refueling button coupled adjacent to the refueling inlet;
the refueling button configured to:
displace inwards responsive to the refueling door being displaced inwards;
displace outwards responsive to the refueling door being displaced outwards; and
return to a neutral position responsive to the refueling door being closed.

10. The system of claim 9, further comprising:
a potentiometer coupled to the refueling button, the potentiometer configured to:
output a full voltage signal responsive to a positive displacement;
output a half voltage signal responsive to a neutral displacement; and
output a zero voltage signal responsive to a negative displacement.

11. The system of claim 10, where an inward displacement of the refueling button initiates the positive displacement of the potentiometer, an outward displacement of the refueling button initiates the negative displacement of the potentiometer, and a return to the neutral position of the refueling button initiates the neutral displacement of the potentiometer.

12. The system of claim 10, wherein the controller is further configured with instructions stored in non-transitory memory, that when executed, cause the controller to:
seal the fuel tank and lock the refueling door responsive to the return to the neutral position of the refueling button.

13. The system of claim 7, further comprising:
an LED display encircling the refueling inlet;
the controller further configured with instructions stored in non-transitory memory, that when executed, cause the controller to:
dynamically illuminate the LED display concurrent with the fuel tank depressurization sequence.

14. The system of claim 13, wherein the controller is further configured with instructions stored in non-transitory memory, that when executed, cause the controller to:
dynamically illuminate the LED display responsive to changes in a fuel tank fuel level.

15. A method for a vehicle, comprising:
receiving a voltage signal from a potentiometer indicating a refueling request, the refueling request comprising an operator inwardly pressing a refueling door configured to engage the potentiometer;
depressurizing a fuel tank while maintaining the refueling door locked;
unlocking the refueling door when a fuel tank pressure is below a pressure threshold;
receiving a voltage signal from the potentiometer indicating the refueling door is open;
receiving a voltage signal from the potentiometer indicating the refueling door is closed; and
sealing the fuel tank and locking the refueling door responsive to receiving the voltage signal from the potentiometer indicating the refueling door is closed.

16. The method of claim 15, wherein:
the voltage signal from the potentiometer indicating a refueling request is a 5 volt signal;
the voltage signal from the potentiometer indicating the refueling door is closed is a 2.5 volt signal; and
the voltage signal from the potentiometer indicating the refueling door is open is a 0 volt signal.

17. The method of claim 15, further comprising illuminating an LED display to convey to the operator a refueling status during refueling.

18. The method of claim 17, wherein the refueling status is a fuel tank pressure and the LED display is configured to dynamically illuminate concurrent with a fuel tank depressurization sequence.

19. The method of claim 17, wherein the refueling status is a fuel tank fuel level and the LED display is configured to illuminate responsive to changes in the fuel tank fuel level.

* * * * *